Aug. 20, 1957     S. J. ERLING     2,803,423

SELF-CYCLING VALVE

Filed Oct. 18, 1955

INVENTOR.
Sven Johan Erling
BY Davis, Hoxie & Faithfull
ATTORNEYS

United States Patent Office 2,803,423
Patented Aug. 20, 1957

2,803,423

SELF-CYCLING VALVE

Sven Johan Erling, Bromma, Sweden, assignor to Aktiebolaget Separator, Stockholm, Sweden, a corporation of Sweden Application October 18, 1955, Serial No. 541,259

Claims priority, application Sweden October 18, 1954

7 Claims. (Cl. 251—13)

The present invention relates to an improved valve for intermittent supply of air or other gas to a pipe line, or the like.

The new valve may be used to particular advantage in milking systems wherein air or other gas is to be supplied intermittently to a flow of flushing liquid passing through the milk lines so that these lines are efficiently cleaned, such a system being disclosed in my copending application Serial No. 437,166, filed June 16, 1954. However, the valve is applicable also to other uses where intermittent supply of a gas is desired.

The principal object of the present invention is to provide a valve which opens and closes very rapidly so that strong pressure variations arise in the gas flowing into the milk line and an efficient flushing of the line is thereby obtained, while a vacuum maintained in the line is not subjected to variations which are inordinately great.

A valve made according to the invention has two chambers which are separated from each other by means of a diaphragm but communicate with each other through a bleed duct, one of these chambers being closed and the other being adapted for connection to the pipe line which communicates with a vacuum source and in which a varying pressure is to be maintained. The latter of these two chambers is connected by a passage with the outer atmosphere, and this passage is provided with a valve member operable by the diaphragm to close the passage intermittently.

To counteract the inertia in the movements of the diaphragm so that the valve is closed more rapidly, it is preferable to have the diaphragm actuated toward its valve-closing position by a weight or spring or other biasing element. The valve member may be part of the diaphragm itself but is preferably a disc secured to the closing side of the diaphragm and adapted to seal against a sealing ring forming a valve seat.

The opening and closing movements of the diaphragm are, of course, determined by the difference between the forces acting on both sides of the diaphragm. These can be composed of forces of constant size (for instance, springs) and of variable size (varying air-pressure). In the structure described more in detail below, the constant forces consist of a weight on one side of the diaphragm and, on the other side, of the air-pressure influencing an annular area of the diaphragm, while the variable forces are represented by an air-pressure which is variable on both sides of the diaphragm. In one embodiment of the invention, that area of the valve disc which is surrounded by the aforementioned sealing ring is smaller than that area of the diaphragm which is influenced by the air-pressure in the closed chamber. This arrangement permits the reversals in pressure difference which are necessary for the opening and closing movements of the diaphragm, and its advantages appear hereinafter from the description of the accompanying drawing.

In order that the valve may function as intended, it is necessary that air from a source of relatively high pressure (e. g. atmospheric air) enter the closed chamber. This can take place upon the opening movement of the diaphragm, whereby atmospheric air enters the chamber connected to the low pressure or vacuum pipe line and passes from the latter chamber through the above-mentioned bleed duct into the closed chamber. In order to accelerate the pressure increase produced in this manner in the closed chamber, one of the embodiments of the invention has at least one channel passing through the diaphragm and the valve disc. This channel forms a further communication between the two chambers and is shut, in the closing position of the diaphragm, by the valve seat or sealing ring. The same effect is attained in another embodiment of the invention by providing in the wall of the closed chamber a valve which opens in response to the opening movement of the diaphragm and thus brings the closed chamber into communication with the atmosphere. If the diaphragm takes a substantially horizontal position, the last-mentioned valve may be provided with a spindle which hangs freely down over the diaphragm and the lower end of which is engageable by the diaphragm (or by a weight on the diaphragm), so that this spindle is displaced upwards by the opening movement of the diaphragm and thereby opens a valve.

The invention is explained more in detail below, reference being made to the accompanying drawing, in which.

Figure 1:
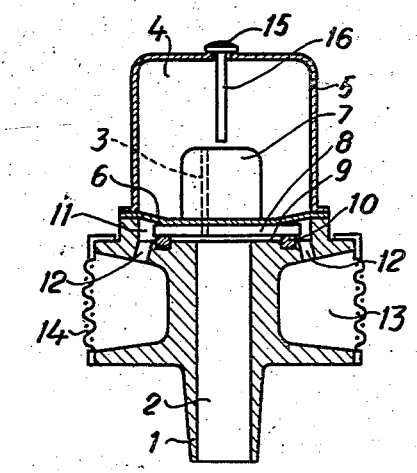
Fig. 1 is a vertical sectional view of one embodiment of the new valve.

In Fig. 1, the reference numeral 1 designates a hollow boss or socket which is to be connected to the vacuum pipe line or other region of relatively low pressure (not shown), to which air or other gas is to be supplied. The interior of the socket forms a chamber 2 which communicates through a bleed duct 3 with a closed chamber 4, the wall 5 of which may be formed by a hollow cover. The chambers 2 and 4 are divided by a diaphragm 6 which on its upper side carries a weight 7 and on its underside is connected to a valve member or disc 8. The chamber 2 opens upwardly through a horizontal surface 9 in which a sealing ring 10 is secured, the latter forming a valve seat against which the valve disc 8 is adapted to seal. Below the outer portion of diaphragm 6 is an annular chamber 11 which communicates through holes 12 with an annular channel 13 in the socket 1. Outwardly, this channel is covered by a cylindrical screen 14 through which air from the atmosphere can pass into the interior of the socket 1. A valve 15 with a depending spindle 16 is provided in the top of the hollow cover 5. The bleed duct 3, as shown, extends through disc 8, diaphragm 6 and weight 7.

It will be observed from the foregoing that the parts 1 and 5 constitute means forming with the diaphragm 6 two chambers 2 and 4 which are separated from each other by the diaphragm; and the weight 7 constitutes a biasing means urging the diaphragm toward its valve-closing position.

The device illustrated in Fig. 1 operates as follows:

In the starting position of valve disc 8, as shown, the disc 8 lies in contact with the sealing ring 10, and there is atmospheric pressure in the closed chamber 4. Thus, the pressure on the diaphragm 6 is higher on its upper side facing chamber 4 than on the lower side where there is vacuum at that part of the diaphragm surface which is situated inside the sealing ring 10, and there is atmospheric pressure at the outer part of the diaphragm surface bordering on the chamber 11. Consequently, the valve member 8 is held closed. The closed chamber 4, however, is evacuated by bleed duct 3 until the pressure on the underside of the diaphragm, due to the atmospheric pressure present in the chamber 11, exceeds the pressure on the upper side of the diaphragm, including the force of the weight 7. Thereupon, the diaphragm 6 moves upward to unseat the valve member 8, and air from the chamber 11 passes into the chamber 2, causing a rush of air through this chamber to the vacuum pipe line (not shown). Air entering chamber 2 also passes through the bleed duct 3 into the chamber 4 until the pressure there becomes high enough to return diaphragm 6 to its lowermost position and thereby re-seat the valve member 8.

In order to cause rapid surges of air through chamber 2 without spoiling the vacuum maintained in the vacuum pipe line connected to the socket 1, it is desirable that the communication with the atmosphere through the passage 11—12 be open only for short periods. Accordingly, means are provided for admitting additional air from the atmosphere into the chamber 4 in response to the opening movement of the diaphragm. Such means, as shown in Fig. 1, comprise a valve 15 located in the top of hollow cover 5 and having a depending spindle 16. Upon upward movement of the diaphragm 6, the weight 7 engages the spindle 16 and pushes it upward. As a result, air passes directly into the chamber 4 so that the pressure in this chamber rises rapidly, thereby re-closing valve member 8.

Figure 2:
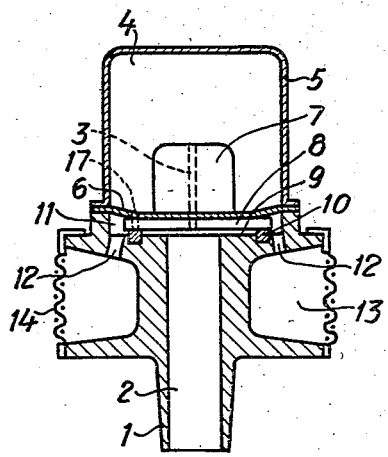
Fig. 2 is a similar view of another embodiment.

In Fig. 2, I have shown another way of producing a rapid flow of air into the chamber 4 by the opening movement of the diaphragm 6. As shown in Fig. 2, one or more channels 17 extend through the diaphragm 6 and the valve disc 8 and are located directly above the valve seat 10. These channels 17 are therefore sealed by the seat or sealing ring 10 in the closing position of diaphragm 6 but are uncovered when the diaphragm (and hence the valve member 8) moves upward. Thus, air passes from the chamber 11, which is under atmospheric pressure, directly into the chamber 4 so that a rapid pressure increase is obtained in the latter chamber.

I claim:

1. In a valve for intermittently supplying a gas from a source of relatively high pressure to a region of relatively low pressure, the combination of a diaphragm, means forming with said diaphragm two chambers which are separated from each other by the diaphragm, one of said chambers being closed and the second chamber being adapted for connection to said region of relatively low pressure, a bleed duct interconnecting said chambers, said means also having a passage therein for connecting the second chamber to said high pressure source, a valve member in said passage connected to the diaphragm and operable thereby to close said passage intermittently, and means responsive to opening movement of the valve member by the diaphragm for admitting gas into said closed chamber independently of said bleed duct.

2. The combination according to claim 1, comprising also biasing means connected to the diaphragm and urging the same toward its valve-closing position.

3. The combination according to claim 1, in which the valve member is a disc secured to one side of the diaphragm, the combination comprising also a sealing ring forming a seat engageable by the disc to close said passage.

4. The combination according to claim 1, in which the valve member is a disc secured to one side of the diaphragm, the combination comprising also a sealing ring forming a seat engageable by the disc to close said passage, the area of the valve disc surrounded by the sealing ring being smaller than the area of the diaphragm which is influenced by the pressure in the closed chamber.

5. The combination according to claim 1, in which said responsive means include a channel extending through the diaphragm and the valve member, and a valve seat engageable by the valve member and disposed opposite said channel, whereby the channel is opened and closed simultaneously with said passage.

6. The combination according to claim 1, in which said responsive means include a valve in the wall of the closed chamber.

7. The combination according to claim 1, in which said responsive means include a valve in the wall of the closed chamber, and a spindle depending from said last valve and engageable at its lower end by upward movement of the diaphragm incident to opening of said passage by the valve member.

References Cited in the file of this patent

UNITED STATES PATENTS

| 1,432,743 | Constantinesco | Oct. 24, 1922 |
| 1,854,467 | Fourness | Apr. 19, 1932 |
| 2,232,254 | Morgan | Feb. 18, 1941 |
| 2,615,675 | Mellert | Oct. 28, 1952 |